United States Patent
Zhuang (10) Patent No.: US 12,520,911 B2
(45) Date of Patent: Jan. 13, 2026

(54) CONNECTING BUCKLE END FITTING

(71) Applicant: WENZHOU YUANFEI PET TOY PRODUCTS CO., LTD., Wenzhou (CN)

(72) Inventor: Mingyun Zhuang, Wenzhou (CN)

(73) Assignee: WENZHOU YUANFEI PET TOY PRODUCTS CO., LTD., Wenzhou (CN)

(*) Notice: Subject to any disclaimer, the term of this patent is extended or adjusted under 35 U.S.C. 154(b) by 0 days.

(21) Appl. No.: 18/421,862

(22) Filed: Jan. 24, 2024

(65) Prior Publication Data
US 2025/0213008 A1    Jul. 3, 2025

(30) Foreign Application Priority Data

Jan. 2, 2024    (CN) .......................... 202410007067.1

(51) Int. Cl.
*A44B 11/00*    (2006.01)

(52) U.S. Cl.
CPC .................................. *A44B 11/006* (2013.01)

(58) Field of Classification Search
CPC ... A44B 11/006; A44B 11/00; Y10T 24/3909; Y10T 24/3969; Y10T 24/3973; Y10T 24/39; Y10T 24/4745; Y10T 24/4736; Y10T 24/47; F16B 2/04; F16B 2/06; F16B 2/14; F16B 21/12; A44C 5/185
USPC ...................................... 24/265 BC; 403/275
See application file for complete search history.

(56) References Cited

U.S. PATENT DOCUMENTS

| | | | | |
|---|---|---|---|---|
| 231,751 A * | 8/1880 | Bailey et al. | ......... | F16B 45/024 24/599.6 |
| 315,490 A * | 4/1885 | Engelmann | ............. | F16G 11/04 403/275 |
| 1,197,073 A * | 9/1916 | Smith | ...................... | F16G 11/04 403/275 |
| 2,327,831 A * | 8/1943 | Sutton | .................... | H02G 1/081 403/275 |
| 3,100,924 A * | 8/1963 | Trier | ........................ | F16G 11/05 403/275 |
| 3,909,886 A * | 10/1975 | Hocke | .................... | H02G 1/081 403/275 |
| 3,989,400 A * | 11/1976 | Smith | ...................... | F16G 11/02 403/275 |
| 4,432,663 A * | 2/1984 | Lasak | ..................... | F16G 11/02 403/275 |

(Continued)

FOREIGN PATENT DOCUMENTS

CN    217242086 U   *  8/2022
CN    116998803 A   * 11/2023   ............. A44B 11/00

*Primary Examiner* — Jack W Lavinder
*Assistant Examiner* — Louis A Mercado
(74) *Attorney, Agent, or Firm* — Westbridge IP LLC (57) ABSTRACT

A connecting buckle end fitting includes a connecting body, a sleeve, a pin, and a bushing. The connecting body has a connecting section, an insertion section, and an insertion needle. The connecting section connects with the buckle, the insertion section has a first insertion hole, and the insertion needle has an outer convex ring. The sleeve has a through hole with a second insertion hole and an inner convex ring. The pin passes through the second insertion hole into the first insertion hole. The bushing is located between the insertion section and the inner convex ring. This end fitting securely fixes the rope and reduces wear, extending the rope's service life.

14 Claims, 9 Drawing Sheets

(56) References Cited

U.S. PATENT DOCUMENTS

| | | | | |
|---|---|---|---|---|
| 5,289,613 | A  * | 3/1994 | Kohl | ........................ F16G 11/02 |
| | | | | 16/108 |
| 6,226,841 | B1 * | 5/2001 | Lin | ......................... F16G 11/00 |
| | | | | 24/135 R |
| 7,451,527 | B2 * | 11/2008 | Pearce | .................... F16G 11/05 |
| | | | | 24/136 L |

* cited by examiner

CONNECTING BUCKLE END FITTING

CROSS-REFERENCE TO RELATED APPLICATIONS

This application claims priority to Chinese Patent Application No. 202410007067.1, filed on Jan. 2, 2024, the content of which is incorporated herein by reference in its entirety.

TECHNICAL FIELD

The present application relates to the technical field of outdoor equipment, specifically involving a connecting buckle end fitting.

BACKGROUND

Buckles are commonly used in daily life, mainly to quickly connect ropes or straps to other objects.

For example, Chinese Patent Publication No. CN217242086U discloses a high-strength tensile pet hook buckle, which includes a hook body, a bolt body, and a ring body. The bolt body is installed in a sliding hole provided on the hook body, and the bolt body can close the opening of the hook body by sliding. The hook body from top to bottom includes a hook portion, a handle portion, and a connecting portion. The sliding hole is coaxially aligned with the handle portion, and the side of the hook portion is provided with a guiding groove communicating with the sliding hole. The side of the bolt body is provided with a protrusion that passes through the guiding groove. The side of the handle portion is a threaded surface, and the threads cooperate with a rotating ring. The rotating ring can be moved to engage with the protrusion by moving, and the ring body is connected to the connecting portion. When using the pet hook buckle, the ring body on it is used to connect with a rope or strap, making it more suitable for connecting with a strap. When using a circular rope to connect with the ring body, the rope is prone to slide on the ring body, causing wear and affecting the rope's lifespan. In addition, knotted ropes have a larger volume, occupying space and affecting aesthetics.

Further, Chinese Patent Application Publication CN116998803A discloses a push-button connecting buckle, comprising a first panel, a first trigger, a second trigger, and a slider. One side of the first panel is provided with a first pivot and a second pivot parallel to the first pivot. The first trigger includes a first connecting part and a first buckle ring connected. The first connecting part is connected to the first pivot and can rotate around the first pivot. The first buckle ring is generally ring-shaped and has a first opening. The second trigger includes a second connecting part and a second buckle ring connected. The second connecting part is connected to the second pivot and can rotate around the second pivot. The slider is connected to the first panel. Both the first trigger and the second trigger have an open position that keeps the first opening open and a closed position where the second buckle ring closes the first opening. The slider can simultaneously drive the first trigger and the second trigger to rotate between the open and closed positions. When using the push-button style connecting buckle, the connecting fitting on it is used to connect with a rope or strap. However, when using a rope to connect with the connecting piece, the same drawbacks exist.

Therefore, there is an urgent need to design a component suitable for connecting the buckle with a circular rope to address the above-mentioned drawbacks.

SUMMARY

The technical problem to be solved by this application is that in the related technology when connecting the buckle to a circular cross-section rope, the rope is prone to slipping during use, causing wear to the rope.

To overcome the deficiencies of the prior art, the present application provides a connecting buckle end fitting.

To achieve the above objectives, the present application provides the following technical solution.

A connecting buckle end fitting includes a connecting body, a sleeve, a pin, and a bushing. The connecting body includes a connecting section, an insertion section, and an insertion needle from one end to the other, with the connecting section used for connecting the buckle, the insertion section having a first insertion hole, and the insertion needle having an outwardly extending convex ring at one end away from the insertion section; the sleeve has a through hole at both ends and a second insertion hole communicating with the through hole, with an integral inner convex ring inside the through hole, the insertion section and insertion needle inserted into the through hole, the convex ring located between the inner convex ring and the insertion section and adjacent to the inner convex ring; the pin passes through the second insertion hole into the first insertion hole; the bushing is placed inside the through hole and between the insertion section and inner convex ring.

In some embodiments, the outer peripheral wall of the connecting section is provided with a slot, and the end of the connecting section away from the insertion needle is provided with an installation hole communicating with the slot.

In some embodiments, the through hole is a circular hole, and the insertion section is cylindrical or prismatic for insertion into the through hole.

In some embodiments, the bushing is a round tube, and the inner convex ring extends radially inward along the through hole, with the inner diameter of the bushing equal to the inner diameter of the inner convex ring.

In some embodiments, the diameter of the outer convex ring is smaller than the inner diameter of the inner convex ring.

In some embodiments, there are two second insertion holes, and the line connecting the centers of the two second insertion holes pass through the axis of the through hole and is perpendicular to the axis of the through hole.

In some embodiments, the second insertion hole includes a first section adjacent to the outer wall of the sleeve and a second section adjacent to the inner wall of the sleeve, with the first section and the second section communicating with each other, and the diameter of the first section is larger than that of the second section, and the end of the pin is embedded in the first section.

In some embodiments, the end of the insertion needle away from the connecting section has a tapered head, with the diameter of the tapered head gradually decreasing in the direction away from the insertion section.

In some embodiments, the end of the tapered head away from the insertion section is located between the inner convex ring and the insertion section and adjacent to the inner convex ring.

In some embodiments, the connecting section near the insertion section has a stop block, and the projection of the stop block on the end face of the sleeve is at least partially outside the contour line of the through hole.

Compared with the prior art, the connecting buckle end fitting provided by the present application can firmly fix the rope and cause less wear and tear on the rope during use, which is beneficial for extending the service life of the rope.

BRIEF DESCRIPTION OF THE DRAWINGS

To further illustrate the technical solutions in the embodiments of the present application or the prior art, a brief introduction will be made to the drawings required in the description of the embodiments or the prior art. The drawings in the following description are only some embodiments of the present application, and ordinary skilled artisans in this field can obtain other drawings based on these drawings without creative effort.

DETAILED DESCRIPTION OF THE EMBODIMENTS

The following detailed description and drawings are used to exemplify the principles of this application, but not to limit the scope of the application. The application can be implemented in many different forms, not limited to the specific embodiments disclosed in the text but including all technical solutions falling within the scope of the claims.

These embodiments are provided to thoroughly and completely describe the scope of the application to those skilled in the art. It should be noted that, unless specifically stated otherwise, the relative arrangement of components and steps, the composition of materials, numerical expressions, and values described in these embodiments should be interpreted as purely exemplary, rather than restrictive.

It should be noted that, unless otherwise specified in the description of this application, the term "multiple" means greater than or equal to two; terms such as "up," "down," "left," "right," "inner," "outer," and the like indicating direction or positional relationships are used for the convenience of describing the application and simplifying the description, and do not indicate or imply that the device or component referred to must have a specific orientation, be constructed and operated in a specific orientation, and therefore cannot be understood as limiting the application. When the absolute position of the object being described changes, the relative positional relationship may also change accordingly.

In addition, the use of the terms "first," "second," and similar words in this application does not imply any order, quantity, or importance, but is only used to distinguish different parts. "Vertical" is not strictly vertical, but within the allowable range of error. "Parallel" is not strictly parallel, but within the allowable range of error. Words like "including" or "comprising" mean that the elements listed before the word are included in the elements listed after the word, and do not exclude the possibility of including other elements.

It should also be noted that, unless otherwise explicitly specified and limited in the description of this application, the terms "installation," "connection," and "linkage" should be broadly understood. For example, it can be a fixed connection or a detachable connection, or an integral connection; it can be directly connected or indirectly connected through an intermediate medium. For those skilled in the art, the specific meaning of the above terms in this application can be understood according to the specific situation. When it is described that a specific device is located between the first device and the second device, there may be an intermediate device between the specific device and the first device or the second device, or there may be no intermediate device.

All terms used in this application have the same meaning as understood by those skilled in the art to which this application belongs unless specifically defined otherwise. It should also be understood that terms defined in general dictionaries should be interpreted to have the same meaning as they do in the relevant technical context and should not be interpreted in an idealized or highly formalized sense unless explicitly defined here.

For ordinary technical personnel in the related field, the known technologies, methods, and equipment may not be discussed in detail, but in appropriate cases, these technologies, methods, and equipment should be considered as part of the manual.

See FIGS. 1-8, the present application provides a connecting buckle end fitting, which includes a connecting body 1, sleeve 2, pin 3, and bushing 4. The connecting body 1 includes a connecting section 11, an insertion section 12, and an insertion needle 13, with the connecting section 11 used for connecting the buckle 6, the insertion section 12 having a first insertion hole 121, and the insertion needle 13 having an outwardly extending convex ring 131 at one end away from the insertion section 12. The sleeve 2 has a through hole 21 at both ends and a second insertion hole 22 communicating with the through hole 21, with an integral inner convex ring 23 inside the through hole 21, the insertion section 12, and insertion needle 13 inserted into the through hole 21, the convex ring 131 located between the inner convex ring 23 and the insertion section 12 and adjacent to the inner convex ring 23. After the insertion section 12 is inserted into the through hole 21, the second insertion hole 22 aligns with the first insertion hole 121 for the pin 3 to pass through the second insertion hole 22 into the first insertion hole 121. The bushing 4 is placed inside the through hole 21 and between the insertion section 12 and inner convex ring 23.

Figure 1:
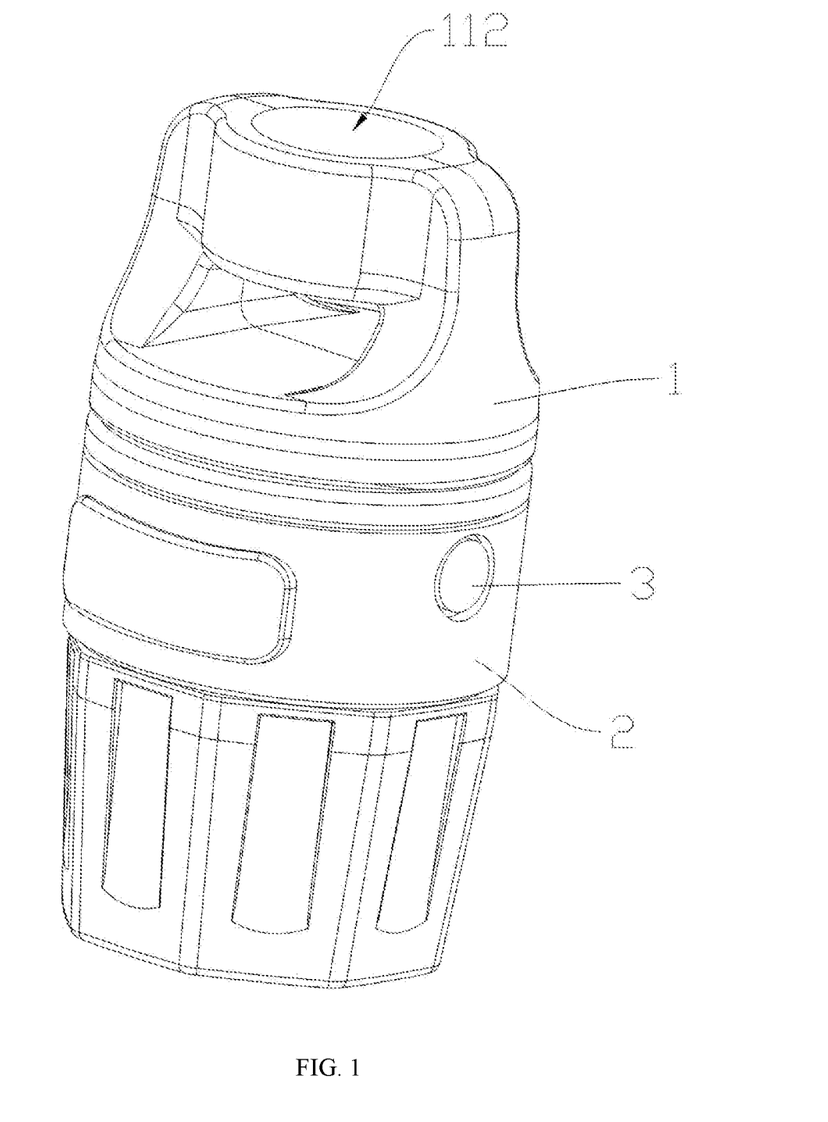
FIG. 1 is a perspective view of an embodiment of the present application.
Figure 2:
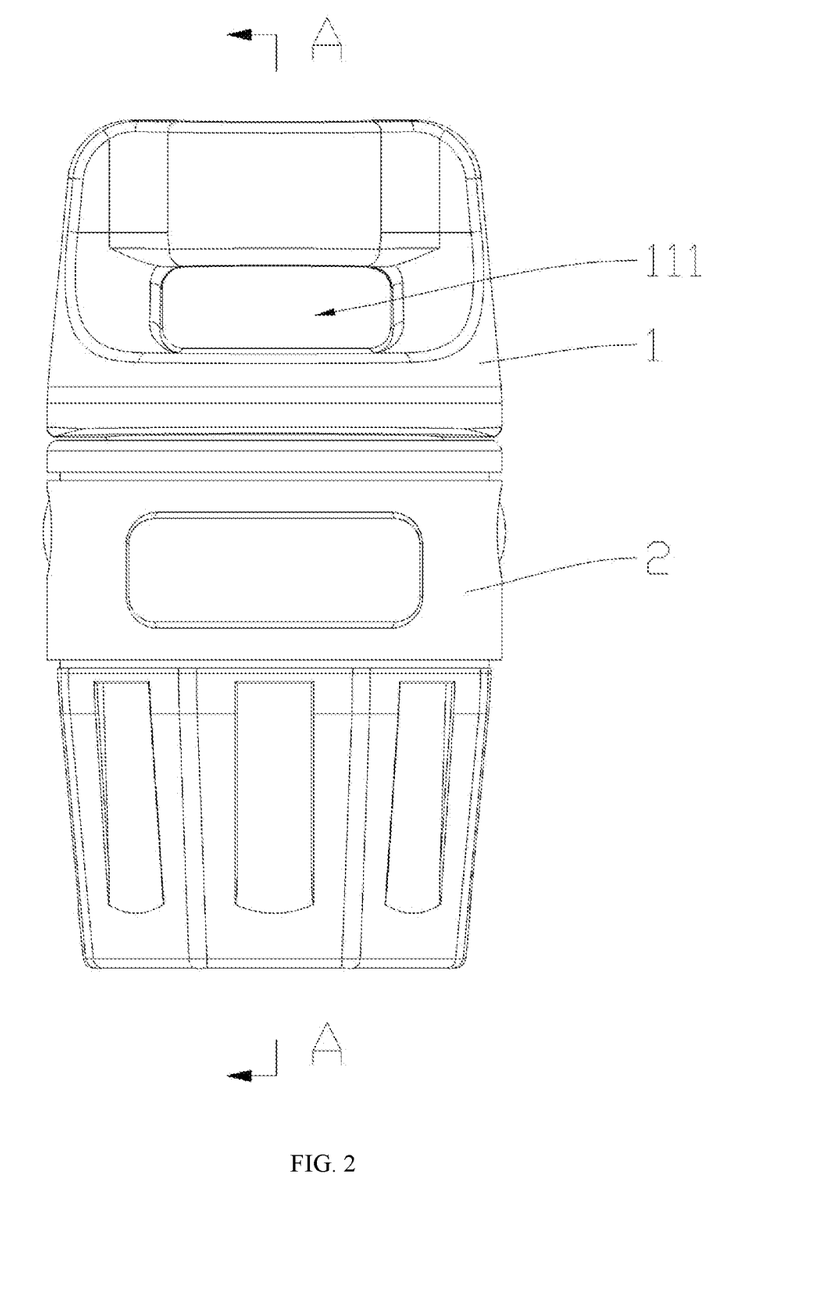
FIG. 2 is a front view of an embodiment of the present application.
Figure 3:
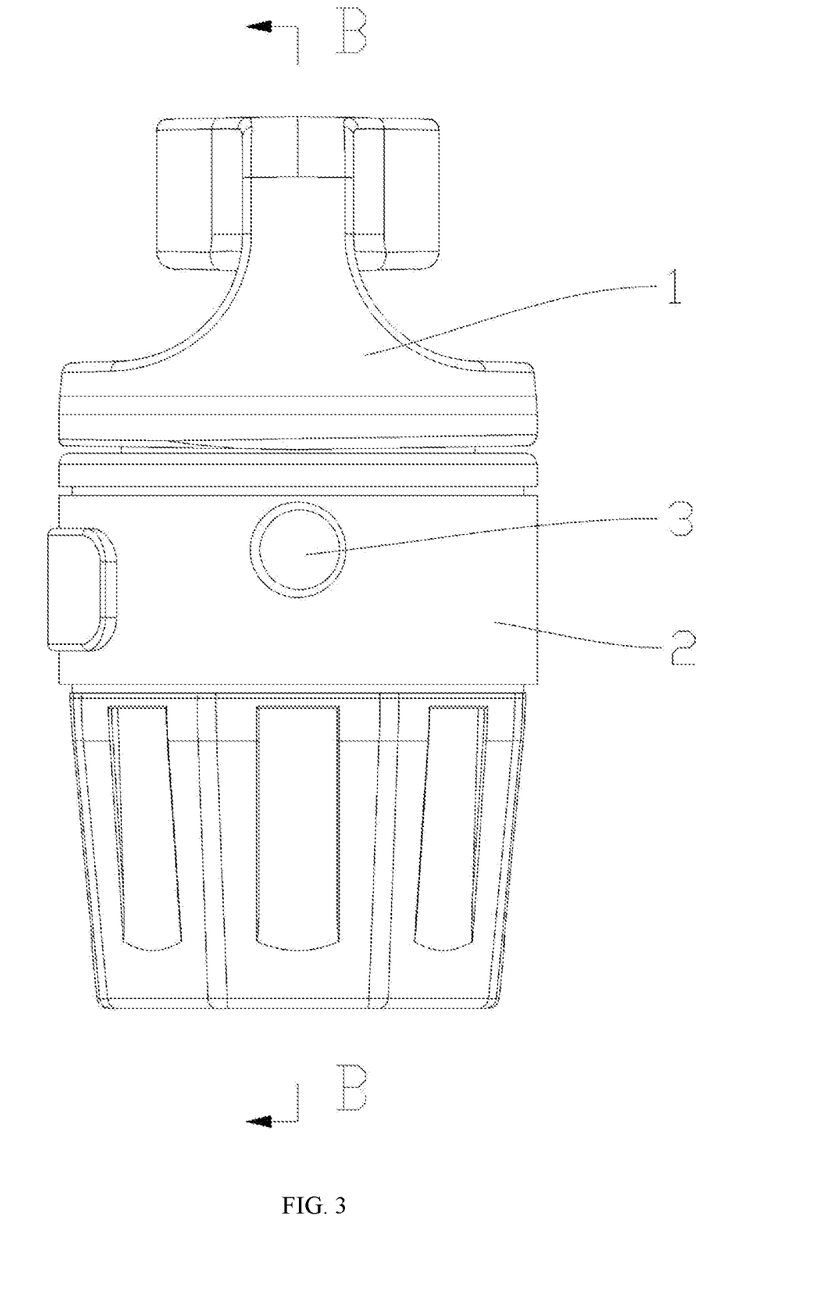
FIG. 3 is a right-side view of an embodiment of the present application.
Figure 4:
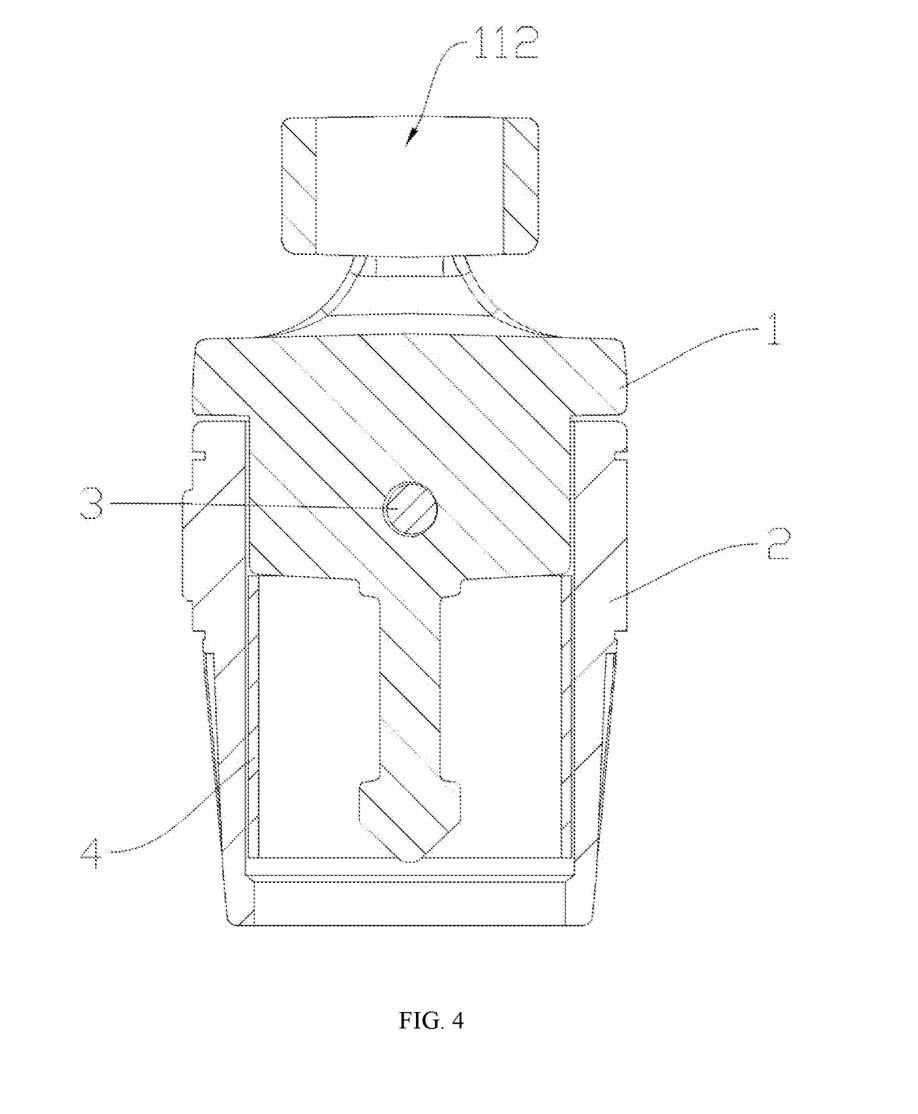
FIG. 4 is a sectional view along line A-A in FIG. 2.

As shown in FIG. 4, compared to the insertion needle 13, the outer wall of the convex ring 131 has a shorter distance to the inner wall of the bushing 4. Before use, the sleeve 2 and the bushing 4 are separated from the connecting body 1. First, the nylon braided rope 5 is threaded through the sleeve 2 and the bushing 4, then the insertion needle 13 is inserted into one end of the rope 5, wrapped around by the rope 5, and then the end of the rope 5 is preliminarily fixed to the insertion needle 13 by adhesive. Next, the bushing 4 is pushed up to fit around the outside of the insertion needle 13, with the end of the rope 5 positioned between the bushing 4 and the insertion needle 13, and the convex ring 131 presses against the bushing 4 to prevent the rope 5 from slipping off. Then, the bushing 4 is moved closer to the connecting body 1, and the insertion section 12 is inserted into the through hole 21, finally, the connecting body 1 is connected to the bushing 4 by the pin 3. When the bushing 4 is installed inside the sleeve 2, it is confined between the insertion section 12 and the inner convex ring 23, further preventing the rope 5 from slipping off.

Therefore, this connecting buckle end fitting can firmly fix the rope 5, and compared with the existing technology, it causes less wear and tear on the rope 5 during use, which is beneficial for extending the service life of the rope 5. Furthermore, this connecting buckle end fitting does not create knots when connecting with the rope 5, saving space and making it more aesthetically pleasing.

Figure 9:
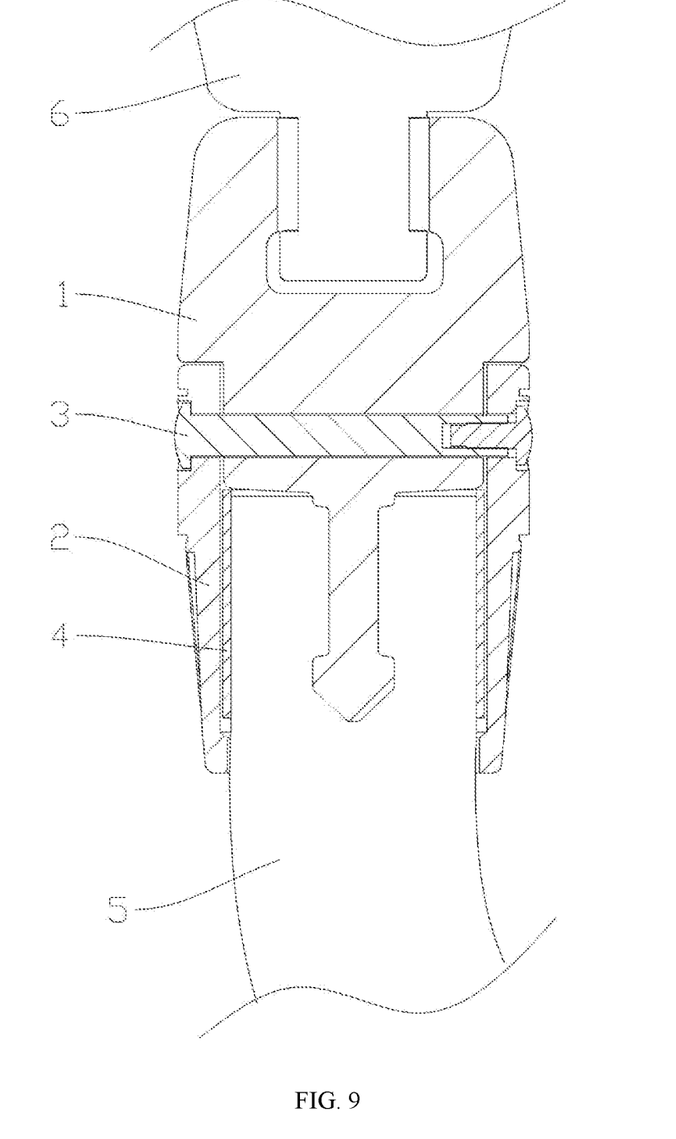
FIG. 9 is a schematic diagram of the embodiment of the present application in actual use.

To facilitate connection with the buckle 6, the outer peripheral wall of the connecting section 11 is provided with a slot 111, and the end of the connecting section 11 away from the insertion needle 13 is provided with an installation hole 112 communicating with the slot 111. FIG. 9 shows a schematic diagram of the end piece provided in this disclosure connected to the buckle 6 in the existing technology, with relevant parts of the connector inserted into the installation hole 112 to connect the buckle 6 to the end piece.

In this embodiment, the through hole 21 is a circular hole, and the insertion section 12 is cylindrical or prismatic and suitable for insertion into the through hole 21. The bushing 4 is a round tube, and the inner convex ring 23 extends radially inward along the through hole 21. The inner diameter of the bushing 4 is equal to the inner diameter of the inner convex ring 23, and the inner diameter of the bushing 4 is about 1-2 mm larger than the diameter of the rope 5. The diameter of the outer convex ring 131 is smaller than the inner diameter of the inner convex ring 23. In specific implementations, the bushing 4 can be cut from a corresponding specification of a round tube, the production method is very simple, and the produced bushing 4 can match the rope 5 very well.

In this embodiment, there are two second insertion holes 22, and the line connecting the centers of the two second insertion holes 22 passes through the axis of the through hole 21 and is perpendicular to the axis of the through hole 21. The second insertion hole 22 is a stepped hole, including a first section 221 adjacent to the outer wall of the sleeve 2 and a second section 222 adjacent to the inner wall of the sleeve 2. The first section 221 and the second section 222 are interconnected, and the diameter of the first section 221 is larger than the diameter of the second section 222. The end of the pin 3 is embedded in the first section 221. By designing the second insertion hole 22 as a stepped hole, the end of the pin 3 can be embedded in the surface of the sleeve 2, avoiding the pin 3 protruding from the bushing 4 and rubbing against other objects, which can effectively prevent hand injuries.

In other embodiments, there can also be only one second insertion hole 22. In this case, the first insertion hole 121 is provided with internal threads, and the pin 3 is provided with matching external threads. After the pin 3 is inserted into the second insertion hole 22, it is rotated into the first insertion hole 121, thereby achieving a threaded connection between the pin 3 and the insertion section 12.

Figure 5:
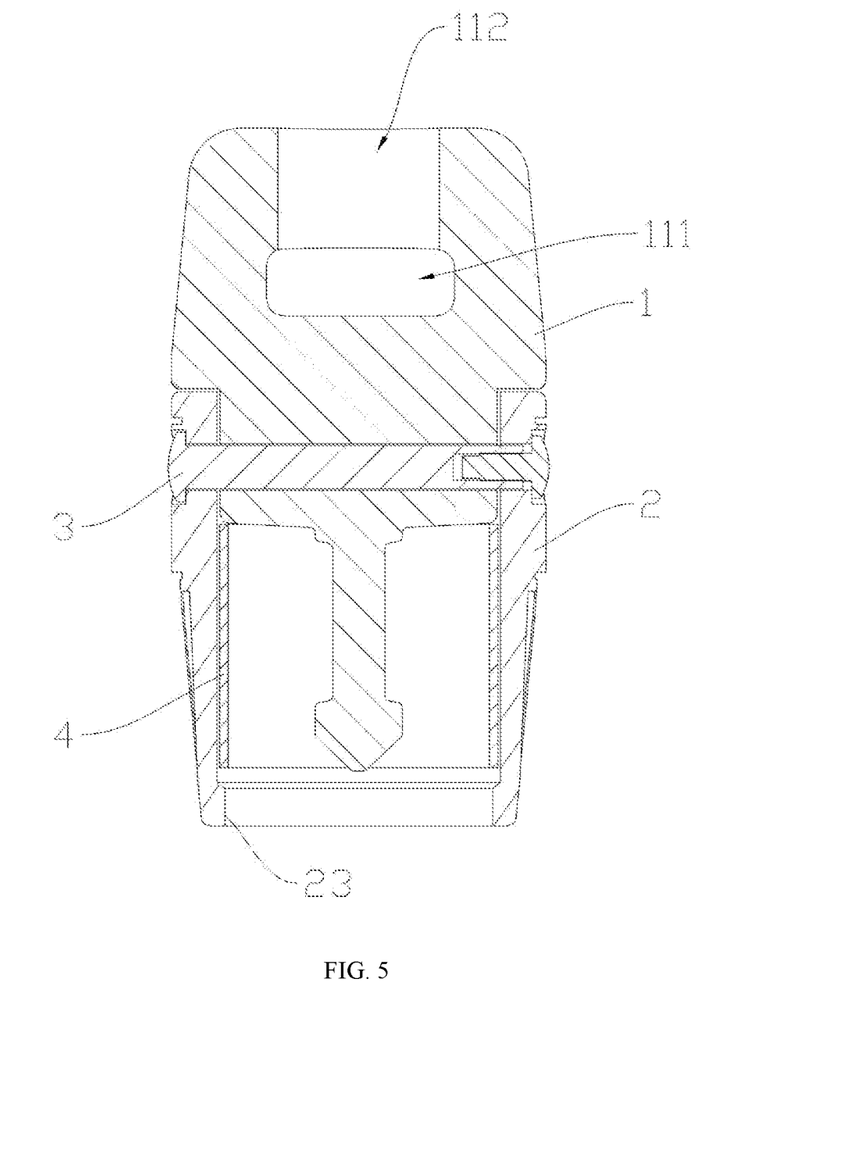
FIG. 5 is a sectional view along line B-B in FIG. 3.
Figure 6:
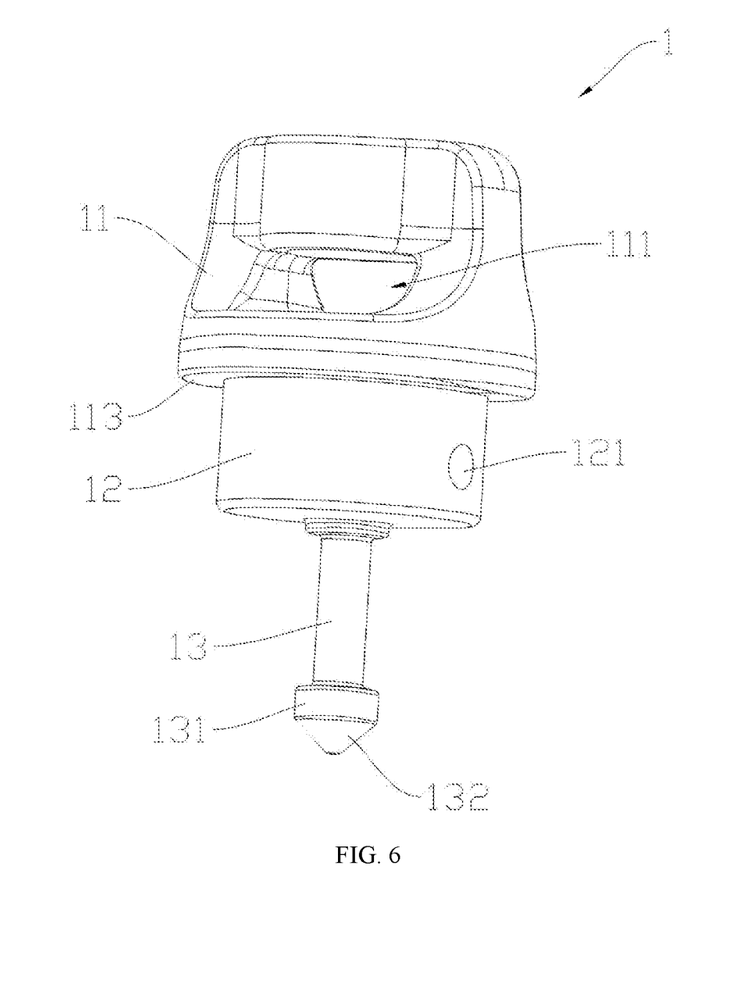
FIG. 6 is a structural diagram of the connecting part in an embodiment of the present application.

In this embodiment, the insertion needle 13 has a tapered head 132 at the end away from the connecting section 11. The diameter of the tapered head 132 gradually decreases in the direction away from the insertion section 12, making it convenient to insert the insertion needle 13 into the end of the rope 5 for assembly. The end of the tapered head 132 away from the insertion section 12 is located between the inner convex ring 23 and the insertion section 12 and is adjacent to the inner convex ring 23, as shown in FIG. 5, the lower end of the tapered head 132 is slightly higher than the inner convex ring 23.

Figure 7:
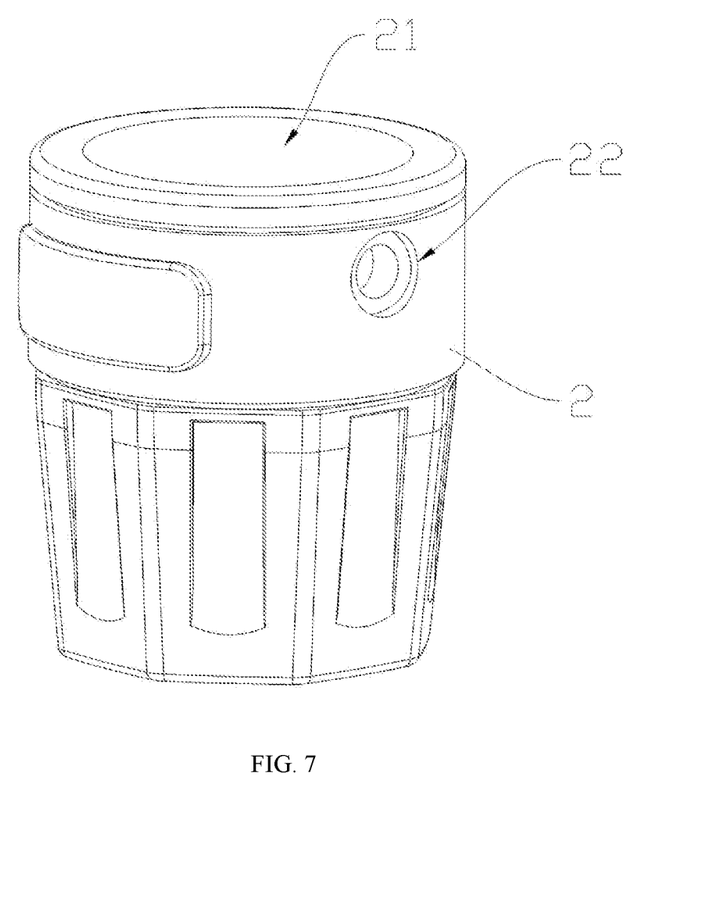
FIG. 7 is a structural diagram of the sleeve in an embodiment of the present application.
Figure 8:
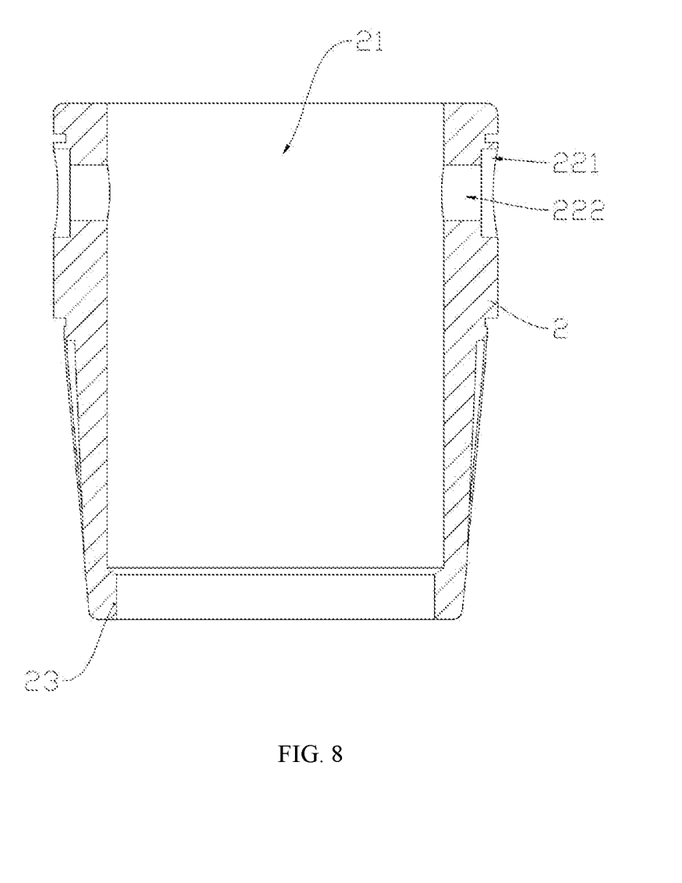
FIG. 8 is a sectional view of the sleeve in an embodiment of the present application.

In this embodiment, the connecting section 11 adjacent to the insertion section 12 has a stop block 113, and the projection of the stop block 113 on the end face of the sleeve 2 is at least partially outside the contour of the through hole 21. As shown in FIG. 7, the stop blocks 113 is annular, and the diameter of the stop block 113 is greater than the diameter of the through hole 21. During the insertion of the insertion section 12 into the through hole 21, the insertion depth of the insertion section 12 is limited by the stop block 113, so that the first insertion hole 121 and the second insertion hole 22 are aligned, thereby ensuring that the pin 3 can be smoothly inserted into the first insertion hole 121 and the second insertion hole 22.

So far, various embodiments of the present application have been described in detail. To avoid obscuring the concept of the present application, some well-known details in this field have not been described. Those skilled in the art can fully understand how to implement the technical solutions disclosed herein based on the above description.

Although specific embodiments of the present application have been described in detail through examples, those skilled in the art should understand that the above examples are for illustration purposes and not for limiting the scope of the present application. Those skilled in the art should understand that modifications can be made to the above embodiments or equivalent replacements of some technical features without departing from the scope and spirit of the present application, especially if there is no structural conflict, various technical features mentioned in each embodiment can be combined in any manner.

What is claimed is:
1. A connecting buckle end fitting, comprising:
a connecting body, wherein the connecting body sequentially comprises an interconnected connecting section, an insertion section, and an insertion needle from one end to another end, the connecting section is used to connect with a buckle, the insertion section is provided with a first insertion hole, and an end of the insertion needle away from the insertion section has an outer convex ring outwardly extending along a radial direction of the insertion needle;
a sleeve, wherein the sleeve is provided with a through hole passing through its two ends and a second insertion hole communicating with the through hole, the through hole is provided with an integral inner convex ring formed with the sleeve, the insertion section and the insertion needle are inserted into the through hole, the outer convex ring is located between the inner convex ring and the insertion section and adjacent to the inner convex ring;
a pin, wherein the pin passes through the second insertion hole and is inserted into the first insertion hole;
a bushing, wherein the bushing is arranged in the through hole and is located between the insertion section and the inner convex ring; and
wherein the second insertion hole comprises a first section adjacent to an outer wall of the sleeve and a second section adjacent to an inner wall of the sleeve, the first section is connected to the second section, a diameter of the first section is larger than a diameter of the second section, and an end of the pin is embedded in the first section, the end of the pin can be embedded in a surface of the sleeve.

2. The connecting buckle end fitting according to claim 1, wherein an outer peripheral wall of the connecting section is provided with a slot, and an installation hole communicating with the slot is provided at an end of the connecting section away from the insertion needle.

3. The connecting buckle end fitting according to claim 2, wherein the connecting section near the insertion section has a stop block, and a projection of the stop block on an end face of the sleeve is at least partially outside an outline of the through hole.

4. The connecting buckle end fitting according to claim 1, wherein the through hole is a circular hole, and the insertion section is cylindrical or prismatic suitable for insertion into the through hole.

5. The connecting buckle end fitting according to claim 4, wherein the connecting section near the insertion section has a stop block, and a projection of the stop block on an end face of the sleeve is at least partially outside an outline of the through hole.

6. The connecting buckle end fitting according to claim 1, wherein the bushing is a round tube, the inner convex ring extends radially inward along the through hole, and the inner diameter of the bushing is equal to an inner diameter of the inner convex ring.

7. The connecting buckle end fitting according to claim 6, wherein a diameter of the outer convex ring is smaller than an inner diameter of the inner convex ring.

8. The connecting buckle end fitting according to claim 7, wherein the connecting section near the insertion section has a stop block, and a projection of the stop block on an end face of the sleeve is at least partially outside an outline of the through hole.

9. The connecting buckle end fitting according to claim 6, wherein the connecting section near the insertion section has a stop block, and a projection of the stop block on an end face of the sleeve is at least partially outside an outline of the through hole.

10. The connecting buckle end fitting according to claim 1, wherein there are two second insertion holes, and a line connecting centers of the two second insertion holes pass through an axis of the through hole and is perpendicular to an axis of the through hole.

11. The connecting buckle end fitting according to claim 10, wherein the connecting section near the insertion section has a stop block, and a projection of the stop block on an end face of the sleeve is at least partially outside an outline of the through hole.

12. The connecting buckle end fitting according to claim 1, wherein an end of the insertion needle away from the connecting section is provided with a tapered head, and a diameter of the tapered head gradually decreases in a direction away from the insertion section.

13. The connecting buckle end fitting according to claim 12, wherein the tapered head is located at an end away from the insertion section between the inner convex ring and the insertion section and is close to the inner convex ring.

14. The connecting buckle end fitting according to claim 1, wherein the connecting section near the insertion section has a stop block, and a projection of the stop block on an end face of the sleeve is at least partially outside an outline of the through hole.

* * * * *